United States Patent
Shuey, Jr. et al.

[15] 3,644,695
[45] Feb. 22, 1972

[54] METHOD AND APPARATUS FOR JOINING PIPE SECTIONS AND FORMING A PIPELINE

[72] Inventors: Robert A. Shuey, Jr., 4405 Highland Drive, Dallas, Tex. 75205; John E. Bartley, 666 Bay View Drive, Aptos, Calif. 95003

[22] Filed: June 18, 1970

[21] Appl. No.: 47,341

[52] U.S. Cl. ...................................219/8.5, 61/72.3, 219/59
[51] Int. Cl. .........................................H05b 5/00, B23k 31/06
[58] Field of Search..........................219/8.5, 59, 60, 61, 105

[56] References Cited

UNITED STATES PATENTS

| | | | |
|---|---|---|---|
| 2,919,335 | 12/1959 | Shaughnessy | 219/59 X |
| 3,137,782 | 6/1964 | Rieppel et al. | 219/61 |
| 1,682,403 | 8/1928 | Murray | 219/105 |
| 3,372,461 | 3/1968 | Tesson | 61/72.3 X |
| 3,072,770 | 1/1963 | Goodridge | 219/8.5 |
| 3,248,512 | 4/1966 | Summer | 219/8.5 |

*Primary Examiner*—R. F. Staubly
*Assistant Examiner*—Hugh D. Jaeger
*Attorney*—Walter J. Jagmin

[57] ABSTRACT

A method and apparatus for forming a pipeline to be layed from a vessel below the surface of a body of water, the apparatus having means for causing outer opposite end portions of each pipe section to be of circular form and of larger interior diameter than the intermediate portions of the pipe sections, means for machining and finishing the opposite circular end surfaces of the pipe sections so that the end surfaces of two sections which are to be welded will have the proper close fit, welding the two end portions of the two pipe sections by inducing electric currents therein while holding the two end portions together under pressure in the absence of air.

A method of forming a long-length pipeline from individual pipe sections which includes forming the end portions of each pipe into true circular configuration and of larger internal diameter than the intermediate portion of the pipe section, finishing the circular end surfaces of each pipe section, bringing the two circular end surfaces of two pipe sections into contacting and concentrically aligned relationship, excluding air from the contacting end surfaces of the two pipe sections while heating the adjacent end portions of the two pipe sections and holding the end surfaces of the two pipe sections together under pressure to cause the end portions to be welded to one another, the welded portions of the pipe providing an internal annular upset which is not of smaller internal diameter than the normal internal diameter of the pipeline. The method may also include the step of welding a pair of sections of pipe to one another and then connecting the pair of joined sections to an end of a pipeline extending from the vessel into a body of water by apparatus which is movable with the pipeline relative to the vessel.

11 Claims, 28 Drawing Figures

INVENTORS
Robert A. Shuey, Jr.
John E. Bartley

BY Walter J. Jay
ATTORNEY

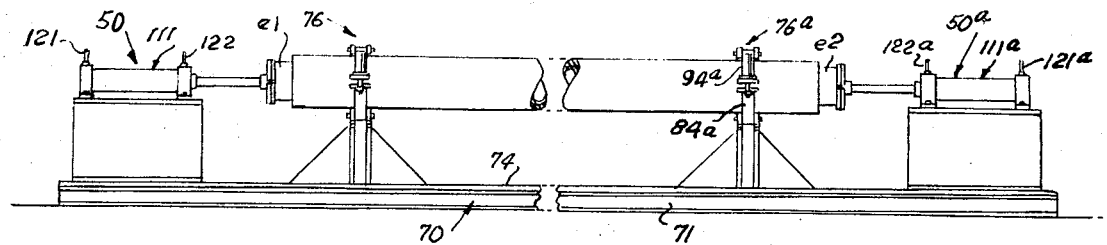
Fig. 7
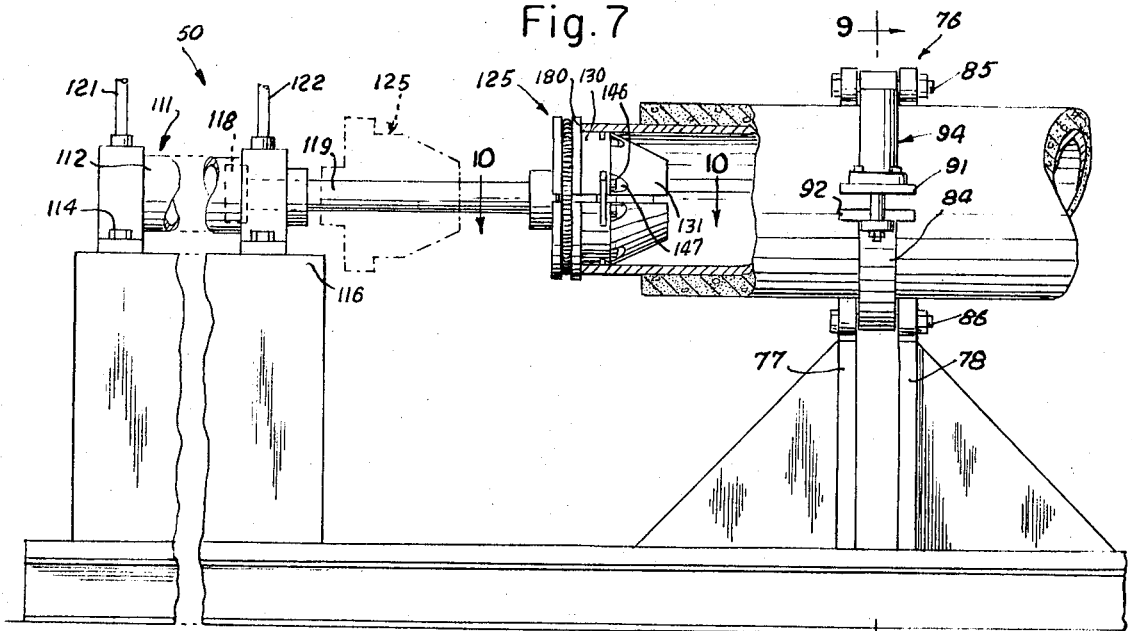
Fig. 8
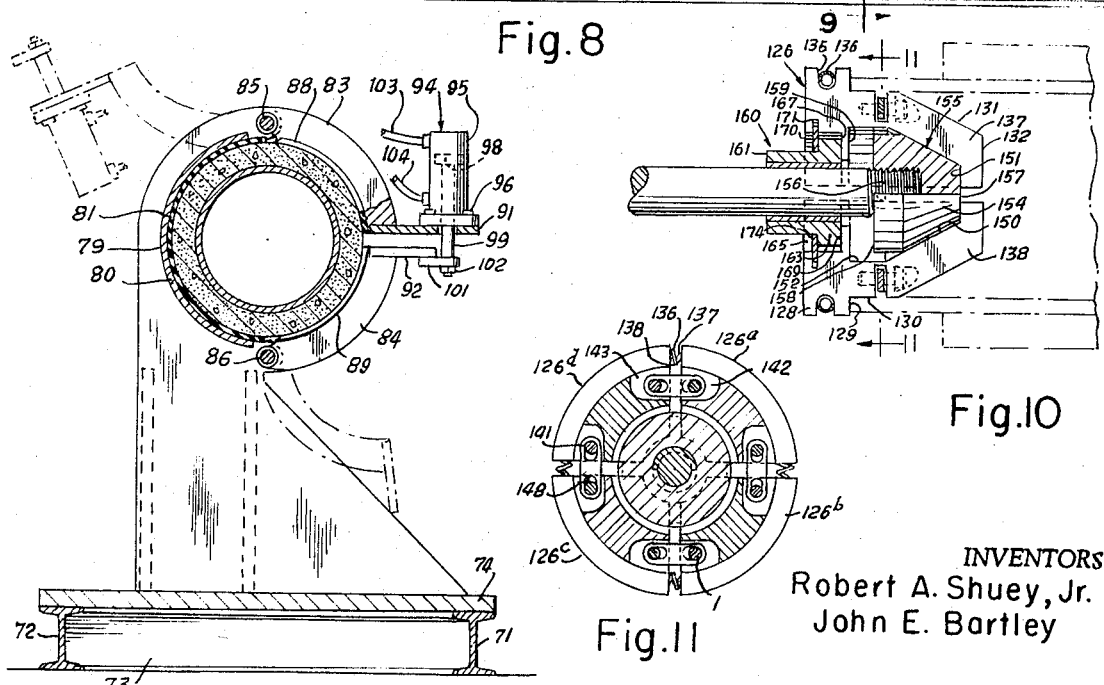
Fig. 9
Fig. 10
Fig. 11
INVENTORS
Robert A. Shuey, Jr.
John E. Bartley
BY Walter J. Jaymes
ATTORNEY

PATENTED FEB 22 1972

INVENTORS
Robert A. Shuey, Jr.
John E. Bartley

BY Walter J. Jay

ATTORNEY

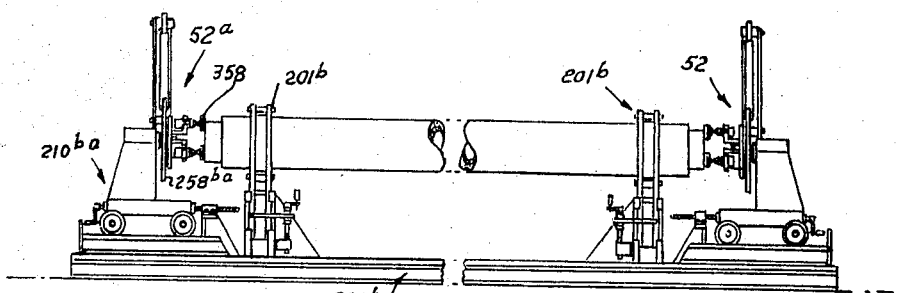
Fig. 15
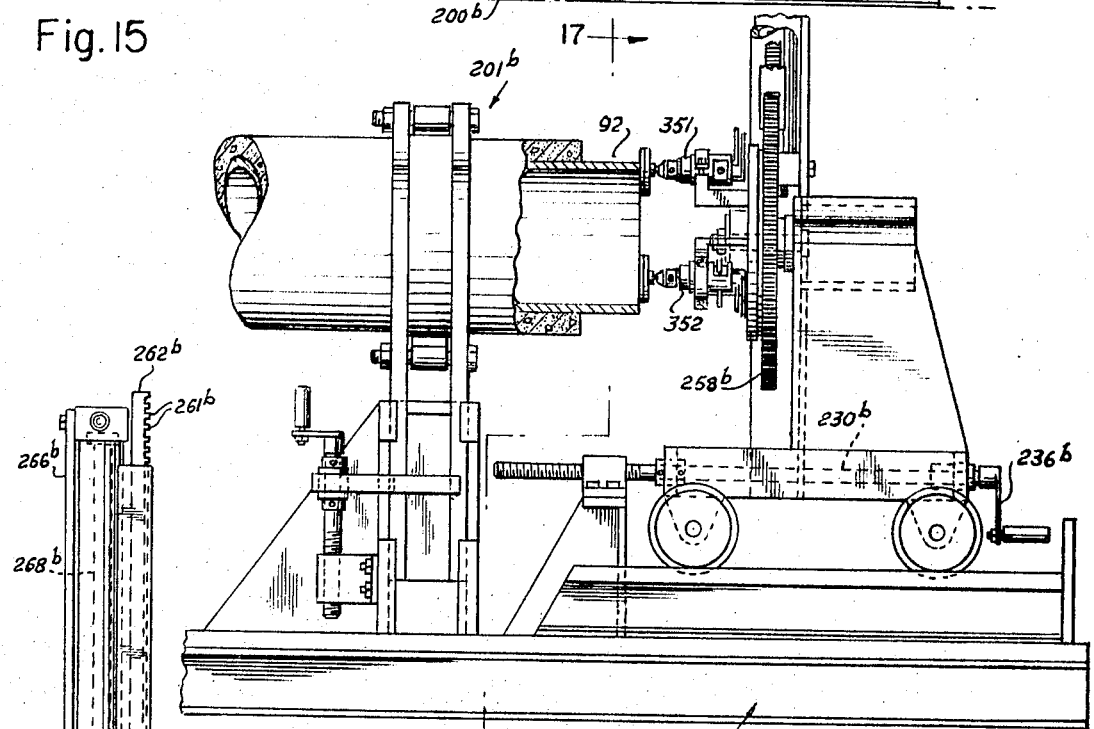
Fig. 16
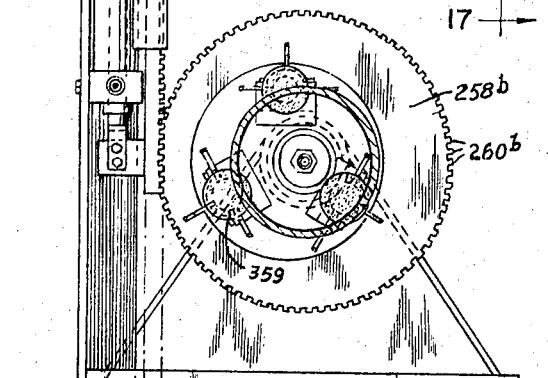
Fig. 17
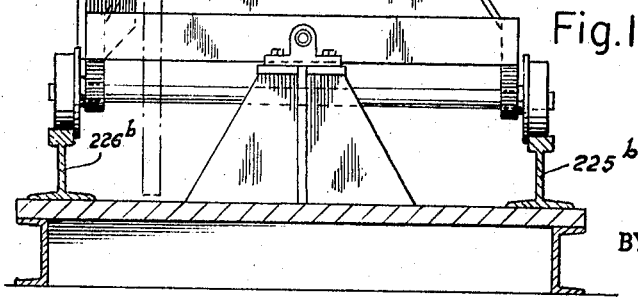

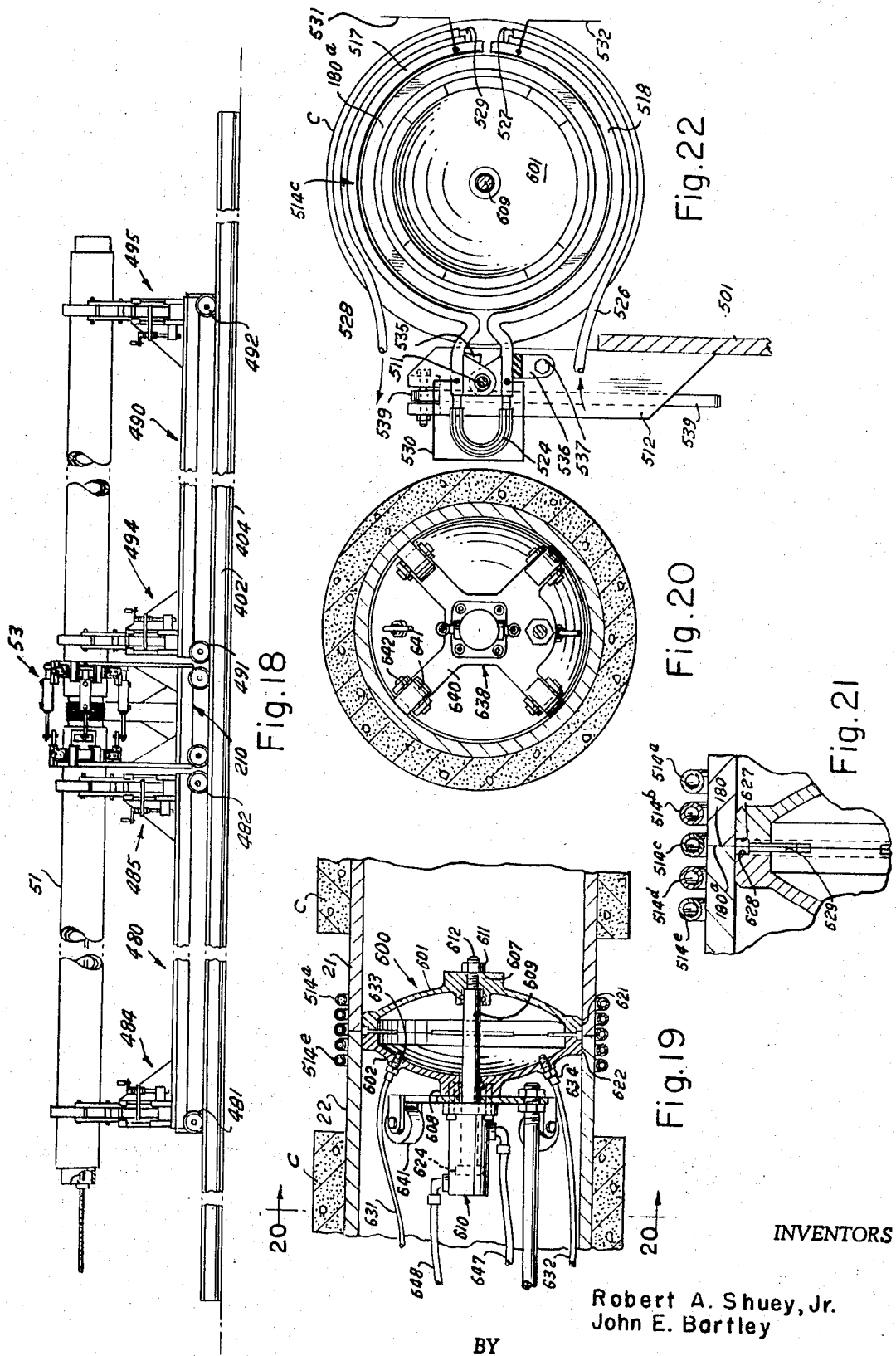

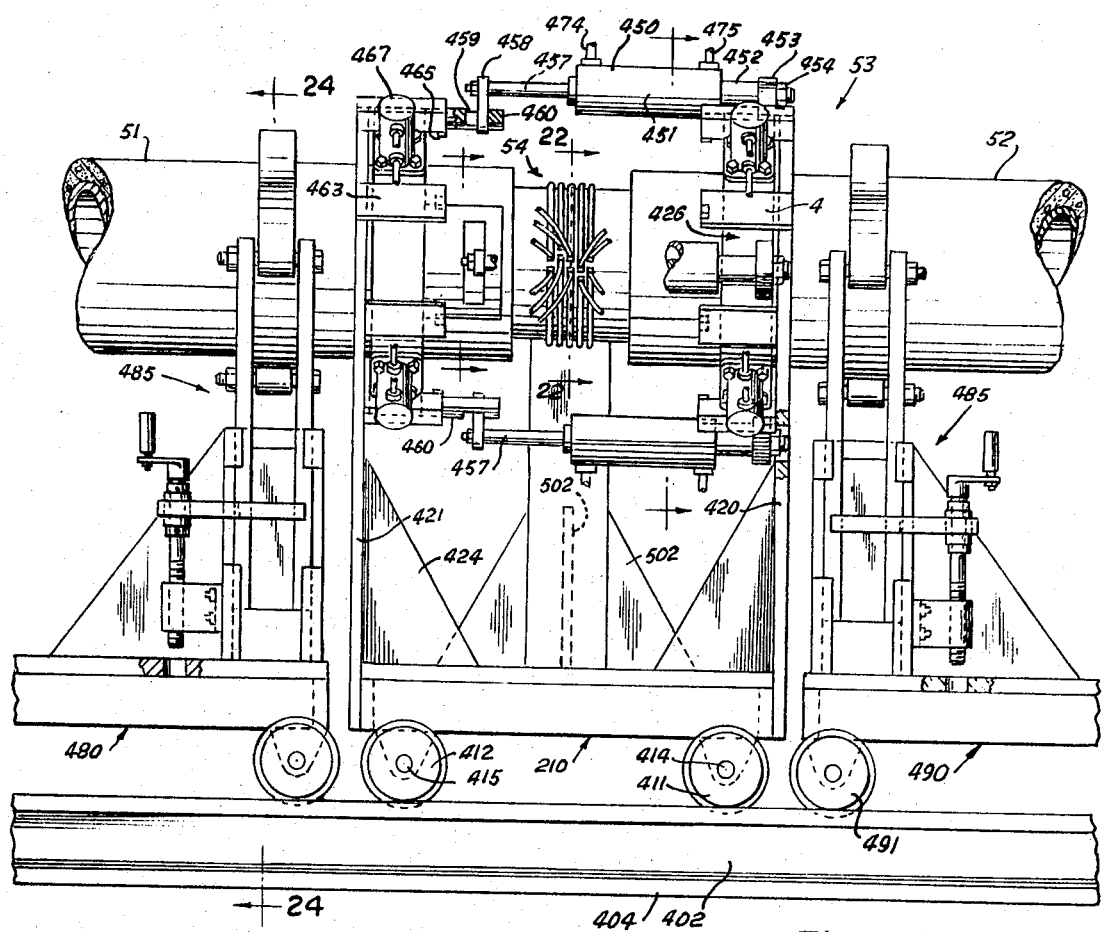
Fig. 23
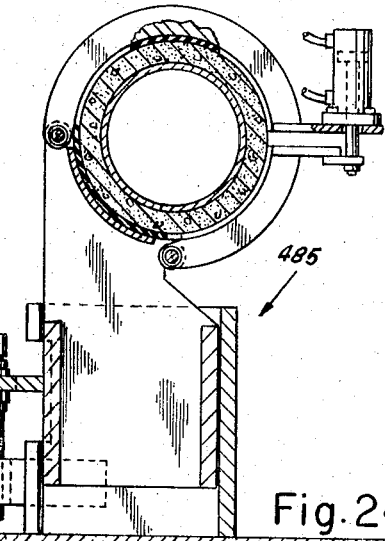
Fig. 24
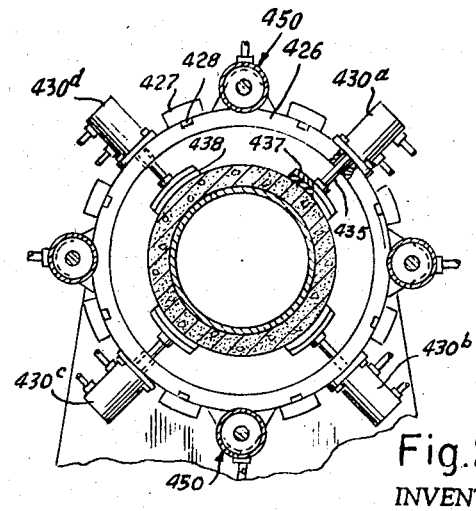
Fig. 25
INVENTORS
Robert A. Shuey, Jr.
John E. Bartley
BY 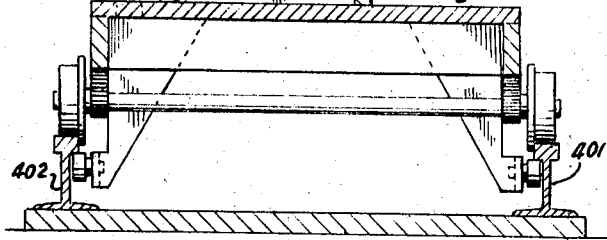
ATTORNEY INVENTORS
Robert A. Shuey, Jr.
John E. Bartley

METHOD AND APPARATUS FOR JOINING PIPE SECTIONS AND FORMING A PIPELINE

This invention relates to a method and apparatus for joining pipe sections to one another and to a method and apparatus for forming a long length pipeline of short pipe sections.

An object of this invention is to provide a new and improved apparatus for joining sections of a pipe to form a continuous long line pipeline such as may be layed from a vessel to an earth surface below a body of water.

Another object is to provide a method and apparatus for forming pipeline of short pipeline sections on a pipeline laying vessel which minimizes the number times the vessel must be moved to lay a predetermined length of the pipeline by joining two pipe sections to one another and then connecting the pair of joined sections to the end of the pipeline located at the deck of the vessel.

Still another object is to provide a method and apparatus for forming pipeline of the type described wherein the apparatus for joining the pipe sections to the upper end of the pipeline on the vessel is movable with the pipeline as the vessel moves relative to the pipeline due to wave action, wind or other causes.

A further object is to provide a method and apparatus for forming and laying pipeline from a vessel which requires a minimum number of personnel for its operation and wherein the pipe sections are joined to one another by butt welding.

A still further object is to provide an apparatus and method for forming pipeline wherein the welds connecting adjacent ends of adjacent pipe sections form internal annular upsets at the locations of the welds which are of smaller internal diameter than the normal internal diameter of the pipeline so that the movement of pipeline tools such as cleaning, coating, or painting tools and the like, through the pipeline will not be hindered or prevented.

An important object of this invention is to provide a new and improved method and apparatus for joining sections of a pipe to one another by butt welding opposed ends of the two sections to one another.

Another object is to provide a method and apparatus for butt welding opposed ends of tow pipe sections which cause the internal annular upset at the location of the weld which does not restrict the effective opening or passage of the pipe.

Still another object is to provide a method and apparatus for joining two end sections of pipe without forming an internal upset of lesser internal diameter than the normal internal diameter of the pipe sections by expanding the opposed end portions of the two pipe sections beyond their elastic limits to cause the opposed end portions of the two sections to be of circular form of a greater internal diameter than the normal diameter of the pipe sections, and butt welding the enlarged end portions to one another by inducing electric currents therein while holding them together with a predetermined force to cause them to weld and form internal and external upsets.

Still another object is to provide a new and improved method and apparatus for butt welding the enlarged and opposed end portions of two sections of pipe to cause both internal and external annular upsets to be formed at the location of the weld by a controlled progressive increase of temperature of the abutting end portions of the two pipe sections by periodically interrupting the inducement of electric current in the opposed end portions and by varying the pressure with which the two end portions are held together.

A further object is to provide a new and improved method and apparatus for butt welding opposed ends of two sections of pipe by radially enlarging the opposed end portions to cause them to have a greater internal diameter than the normal diameter of the pipe sections, finishing the end surfaces to a fine tolerance to cause their end surfaces to lie in parallel planes perpendicular to the longitudinal axes of the sections, bringing the two end surfaces into forcible contact with one another while subjecting the interior surfaces of the abutting end portions at the location to an inert gas, and then inducing electric currents into the abutting portions by an electromagnetic field.

Additional objects and advantages of the invention will be readily apparent from the reading of the following description of a device constructed in accordance with the invention, and reference to the accompanying drawings thereof, wherein:

FIG. 7 is a side view of the apparatus for forming the opposite end portions of the pipe section and into proper circular configuration and enlarged internal diameter;

FIG. 8 is an enlarged perspective view, with some portions broken away, of the forming apparatus illustrated in FIG. 8;

FIG. 9 is a sectional view taken on line 9—9 of FIG. 8;

FIG. 10 is a sectional view taken on line 10—10 of of FIG. 8;

FIG. 11 is a sectional view taken on line 11—11 of FIG. 10;

FIG. 15 is a side view of the lapping apparatus for finishing the opposite end surfaces of a pipe section;

FIG. 16 is an enlarged fragmentary view, with some parts broken away, of the lapping apparatus;

FIG. 17 is a sectional view taken on line 17—17 of FIG. 16;

FIG. 18 is a side view showing the welding and compressing apparatus;

FIG. 19 is a sectional view showing a gas manifold within the two pipe sections being joined to one another;

FIG. 20 is a sectional view taken on line 20—20 of FIG. 19;

FIG. 21 is an enlarged sectional view taken on line 21—21 of FIG. 23;

FIG. 22 is an enlarged fragmentary sectional view showing the induction coils and the gas manifold in operative position relative to the pipe sections being welded;

FIG. 23 is an enlarged side view of the clamping and the welding apparatus;

FIG. 24 is a sectional view taken online 24—24 of FIG. 23;

FIG. 25 is a sectional view taken on line 25—25 of FIG. 23;

Figure 1:
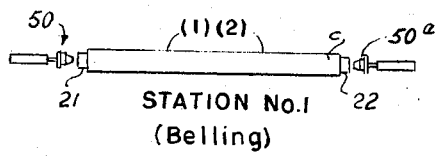
FIGS. 1 through 6 are schematic illustrations showing the steps of the method and the apparatus of the invention positioned on a vessel for joining a plurality of pipe sections to one another and to a pipeline which extends from a vessel downwardly into a body of water.
Figure 2:
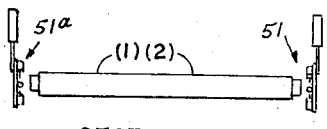
Figure 3:
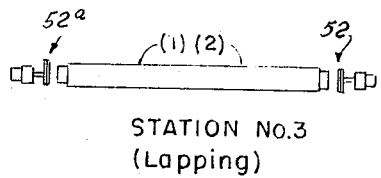

FIGS. 1 through 6 of the drawings illustrate schematically the method and apparatus of the invention for manufacturing a long length pipeline from individual small sections of coated pipe having exposed end portions $e1$ and $e2$ and intermediate portions enclosed by coatings $c$ of concrete or the like by forming or belling the end portions into true circular cross-sectional shape by belling or forming apparatus 50 and 50a, machining the circular opposite end surfaces of the pipe sections by machining apparatus 51 and 51a, finishing the machined end surfaces of the pipe sections by lapping apparatus 52 and 52a, bringing the finished end surfaces of two sections of pipe into forcible compressed contact by means of a clamping apparatus 53, heating the abutting end portions of the two pipe sections by an induction coil assembly 54 to cause the two sections to be welded to one another, coating or applying a field joint to the welded exposed end portions of the two joined pipe sections by an apparatus 55, welding each assembly of two welded pipe sections to the end of the pipeline which extends downwardly from one end of a vessel into a body of water, with the portion of the pipeline depending from the vessel being held under tension by a tension shoe or apparatus 56, by a compressing apparatus 53 and a welding apparatus 54, and then coating the joined exposed end portions of the pipeline and such two pipe section assembly by a coating or field joint apparatus 55.

Referring now particularly to FIGS. 7 through 11 of the drawing, the belling or forming apparatus 50 and 50a are mounted on a base 70 including a pair of spaced longitudinal I-beams 71 and 72 connected by similar spaced transverse I-beams 73 and a top plate 74 extending over the I-beams and welded thereto.

A pair of pipe clamp assemblies 76 and 76a are also mounted on the base. The clamp assembly 76 includes a pair of vertical parallel support columns 77 and 78 whose upper ends have semicircular surfaces 79 which abut a substantially semicylindrical support member 80 which extends between the columns 77 and 78 and is secured thereto, as by welding. A resilient pad 81 is bonded or otherwise secured to the support member. Arcuate top and bottom clamp members 83 and 84 are positioned between and pivotally connected to the support columns by means of shafts or bolts 85 and 86 and are provided with inner cushion pads 88 and 89, respectively. The clamp members 83 and 84 have outwardly extending brackets 91 and 92, respectively.

A hydraulic ram 94 has its cylinder 95 secured to the bracket 91 by means of bolts 96. The piston 98 has a piston rod 99 which extends downwardly through a suitable aperture in the bracket 91 of the top clamp member and has a lug 101 secured thereto, as by means of a nut 102 threaded on the reduced lower end portion of the piston rod, which is adapted to engage the bottom surface of the bracket 92 of the bottom clamp member.

It will be apparent that when hydraulic fluid under pressure is introduced to the upper end of the ram cylinder 95 through the top conduit 103 and is allowed to exhaust from the lowered end of the cylinder through the conduit 104, the piston will be moved downwardly so that the lug 101 may be pivoted about the axis of the piston rol 99 to free the top and bottom clamp members for pivotal movement to their inoperative positions illustrated in broken lines in FIG. 9.

After a pipe section has been moved, by a suitable hoist, to the position illustrated in FIG. 9, and rested in the support member 80 and the pad 81 relative to the clamp assembly 76, the top and bottom clamp members are pivoted back to the position illustrated in FIG. 9, the lug rotated back to alignment with the bracket 92, and hydraulic fluid under pressure is admitted to the lower end of the ram cylinder through the conduit 104 while allowed to exhaust from the conduit 103 to cause the two clamp sections to be pivoted toward one another to clamp and hold the pipe section against movement. A predetermined pressure may be maintained by means well known to those skilled in the art, in the lower end of the ram cylinder 94 so that the clamp assembly 76 will then hold a pipe section with a predetermined pressure.

The clamp assembly 76a being identical in construction with the pipe assembly 76, its elements have been provided with the same reference numerals, to which the subscript "a" has been added, as the corresponding elements of the clamp assembly 76.

The left-hand exposed end portion e1 of the pipe p is moved into a truly cylindrical or circular configuration by the belling or forming apparatus 50. The belling apparatus includes a hydraulic ram 111 whose cylinder 112 is rigidly secured by bolts 114 to a platform 116 rigidly mounted on the base 70, as by welding and the like. The piston 118 of the hydraulic ram 111 has a piston rod 119 concentrically disposed relative to the pipe section held by the clamp assemblies 76 and 76a and is movable to the extended position illustrated in FIGS. 7 and 8 when hydraulic fluid under pressure is communicated to the outer end of the ram cylinder 112 through the conduit 121 while hydraulic fluid is allowed to exhaust from the other end of the cylinder through a conduit 122. Conversely, when fluid under pressure is admitted to the hydraulic cylinder 112 through the conduit 122 while hydraulic fluid is allowed to exhaust from the other end of the hydraulic ram through the hydraulic conduit 121, the piston is moved to its retracted position to move an expanding or belling device 125 mounted on the outer end of the piston rod from its operative position illustrated in full lines in FIG. 8 to its inoperative position illustrated in broken lines in FIG. 8.

The belling or forming device 125 includes an expander assembly 126 shown as having four sections 126a, 126b, 126c and 126d but which may have six or more such sections. Each of the expander sections has an outer external flange 128 which provides an outwardly facing stop shoulder 129, an outer surface 130 which is a section of a circle, and a beveled surface 131 which extends from the outer edge of the surface 130 toward the end surface 132 of the expander section.

The flanges 128 of the expander sections are provided with aligned arcuate external recesses 135 in which a garter spring 136 is disposed which, as will be explained below, biases the four sections inwardly toward their retracted positions. Each of the expander sections has mutually perpendicular side surfaces 137 and 138. It will be apparent that adjacent side surfaces 137 and 138 of adjacent expander sections extend parallel to one another. Adjacent pairs of adjacent expander sections are connected by links 141 disposed in aligned recesses 142 and 143 of the expander sections and bolts 146 whose heads are received in external recesses 147 of the expander sections and whose shanks extend through aligned bores of the sections and elongate slots 148 of the links. The elongate slots permit movement of the expander sections relative to one another.

Each of the expander sections have an internal cam surface 150 which extends arcuately and outwardly from an internal stop shoulder 151 of the expander section to an arcuate internal surface 152 thereof. The cam surface 150 of the four expander sections are engageable by the frustoconical surface 154 of an expander body 155. The outer end portion of the piston rod 119 is threaded in a bore 156 of the expander body. Movement of the expander body in one direction relative to the expander sections is limited by the engagement of its outer circular end surface 157 with the internal stop surfaces 151 of the expander sections and its movement in the opposite direction relative thereto is limited by the engagement of its other end surface 158 with the internal stop shoulders 159 of the sections.

The piston rod extends to the expander body through a bearing assembly 160 which includes a tubular housing 161 provided with an external annular flange 163 disposed in aligned end recesses 165 of the expander sections. The bearing housing is held against inward movement relative to the expander sections due to the engagement of its annular end surface 167 with the stop surfaces 169 of the expander sections and against outward movement relative thereto by a split snap lock ring 170 whose outer peripheral portions are disposed in the recesses 171 of the expander sections and whose inner peripheral portions engage the annular stop shoulder 174 of the housing flange 163. The usual bearing sleeve 175 is mounted in the bearing housing 161.

In use, the expander device 125 is initially in the retracted inoperative position illustrated in broken lines in FIG. 8, with the expander body 154 in an outer position relative to the expander assembly 126 with its end surface 158 in engagement with the stop surfaces 159 of the expander sections 126a-c. When the piston rod is moved toward its extended position, the expander assembly 126 telescope into the end portion e1 of the pipe P which is held rigidly by the clamp assemblies 76 and 76a. It will be apparent that the beveled surfaces 131 of the expander sections engage the internal surfaces of the pipe if the pipe end portion e1 is not of true circular configuration. As one or more of the expander sections engage the pipe, whether at the beveled surfaces 131 or at the circular outer surfaces 130, so that the inward movement of the expander assembly into the end of the pipe is resisted, the piston rod 119 and the expander body 155 will move forwardly relative to the expander 126. The engagement of the beveled cam surface 154 of the expander body with the internal cam surfaces 150 of the expander sections will tend to cause them to move outwardly against the resistance of the garter spring 136. Such forward movement of the expander body relative to the expander assembly will continue until the expander sections are in their fully expanded positions illustrated in FIGS. 8, 10 and 11 and the end surface 157 of the expander body engages the stop surfaces 151 of the expander sections. If the stop surfaces 129 of the expander sections at this time have not yet engaged the circular end surface 180 of the pipe, the inward movement of the expander assembly 126 will continue until the stop shoulders 129 of the expander sections engage the end surface 180 of the pipe. During this inward telescoping movement of the expander 126 into the left end portion $e1$ of the pipe $p$, the engagement of the beveled surfaces 131 and of the circular outer surfaces 130 of the expander sections, which now form sections of a circle of greater diameter than the normal internal diameter of the pipe $p$, cause the end portion $e1$ of the pipe $p$, if it is not of true configuration to be formed back to such configuration and its internal diameter to be increased.

After the expander has moved fully into the end portion $e1$ of the pipe $p$, hydraulic fluid under pressure is introduced into one end of the ram cylinder through the conduit 122 and allowed to exhaust from its other end through the conduit 121. As a result, the piston rod 119 is moved outwardly relative to the pipe and moves the expander body outwardly and out of operative engagement with the cam surfaces 150 of the expander sections of the expander 126. As this movement takes place, the force exerted by the garter spring 136 is effective to move the expander sections inwardly relative to one another so that the surfaces 130 of the expander move inwardly and out of engagement with the internal surfaces of the pipe thus facilitating withdrawal of the expander from the pipe. As the end surface 158 of the expander body engages the internal surfaces 59 of the expander sections, the expander 126 is moved outwardly out of the end portion $e1$ of the pipe.

Since the forming apparatus $50a$ is identical to the forming apparatus 50, its elements have been provided with the same reference numerals, to which the subscript "$a$" has been added, as the corresponding elements of the apparatus 50. It will be apparent that the apparatus $50a$ will function in the same manner as the apparatus 50 to form the other end portion $e2$ of the pipe into true circular configuration.

It will also be apparent that, if desire, apparatus 50 and the apparatus $50a$ may be operated simultaneously in order that the longitudinal forces exerted on a pipe section held by the clamp assemblies 76 and $76a$ be balanced. In this case hydraulic fluid under pressure would simultaneously be introduced through conduits 121 and $121a$ to the outer ends of the ram cylinders 112 and $112a$ while the fluid is allowed to exhaust from their inner ends through the conduits 122 and $122a$. Suitable four way valves may be employed for selectively connecting the pairs of conduits 121 nd $121a$, and 122 and $122a$ to a source of hydraulic fluid under pressure and to a fluid exhaust line of a hydraulic pressure system.

Figure 12:
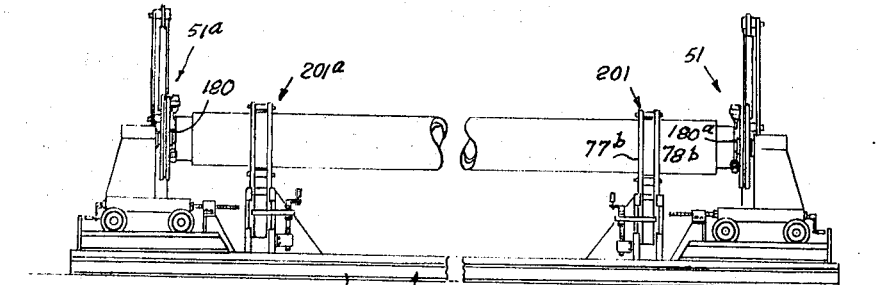
FIG. 12 is a side view of the machining apparatus for machining a circular end surface of the pipe sections.
Figure 13:
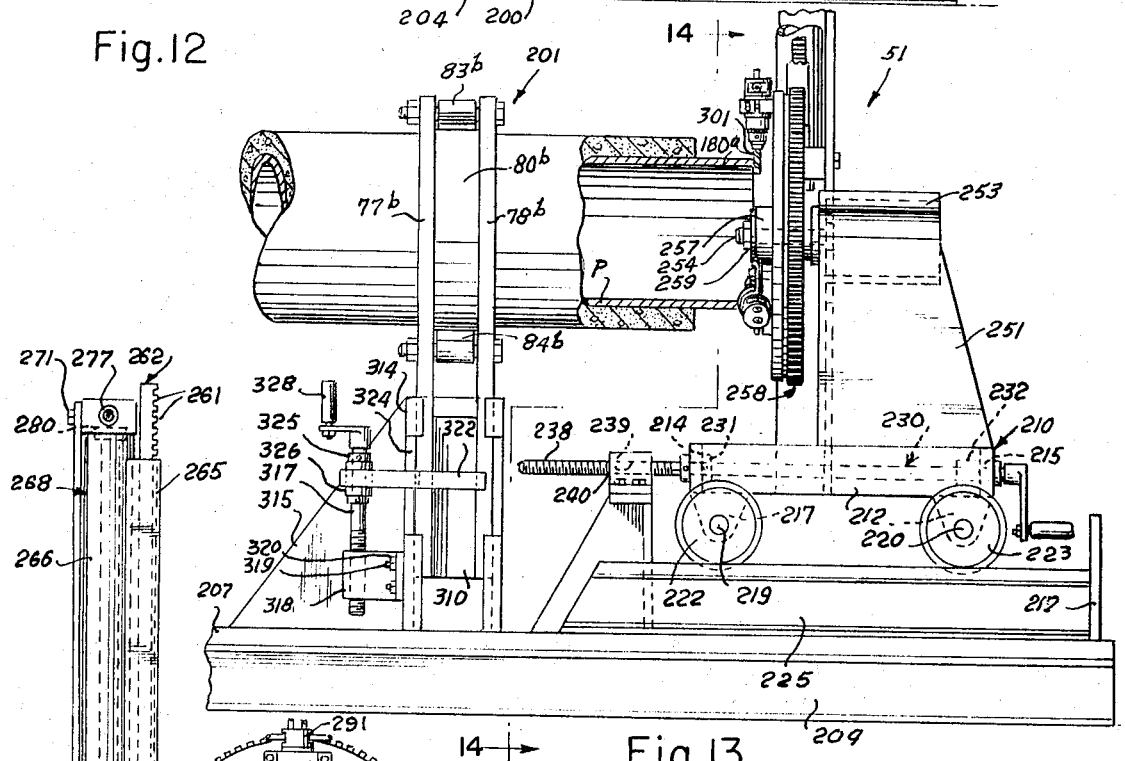
FIG. 13 is an enlarged fragmentary partly sectional view of the machining apparatus illustrated in FIG. 12.
Figure 14:
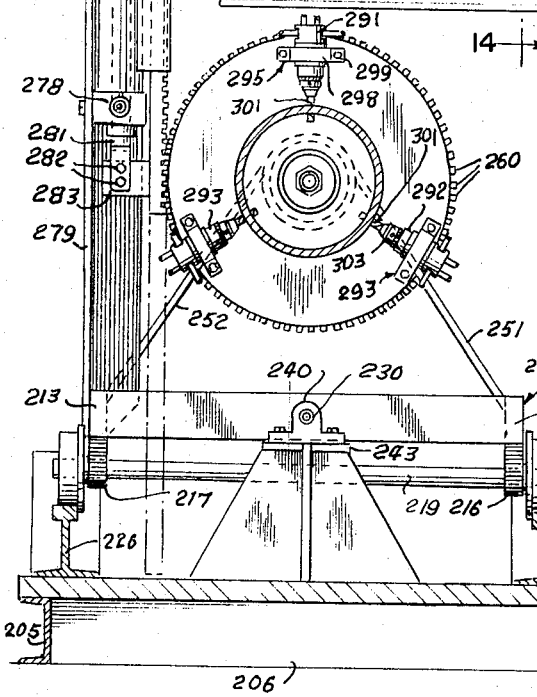
FIG. 14 is a sectional view taken on line 14—14 of FIG. 13.

Referring now particularly to FIGS. 12 through 14 of the drawings, the machining apparatus 51 and $51a$ are mounted on a base 200 on which are also mounted clamp assemblies 201 and $201a$ for rigidly holding a pipe section during the machining of the circular opposite end surfaces 180 and $180a$ of the pipe. The base 200 may be of any suitable form and may include a pair of longitudinal I-beams 204 and 205 which are connected by a plurality of transversely extending I-beams 206. The base includes a plate 207 which rests upon and is welded to I-beams 204, 205 and 206.

The machining apparatus 51 includes a carriage 210 having a rectangular frame 211 having longitudinal members 212 and 213 and transverse members 214 and 215. Front and rear pairs of brackets 217 and 218 dependent from the longitudinal frame members have journaled therein front and rear shafts 219 and 220 on whose outer ends are rotatably mounted pairs of flanged wheels 222 and 223, respectively. The wheels rest upon a pair of tracks 225 and 226 welded on the baseplate 207. A stop plate 217 is provided to limit outward movement of the carriage on the tracks.

The carriage is movable longitudinally on the base by means of a shaft 230 rotatably journaled in the front and rear transverse carriage members 214 and 215 by suitable bearing means 231 and 232 which also prevent longitudinal movement of the shaft relative to the carriage. The outer end of the rotatable shaft is provided with a crank handle 236 while its inner end portion 238 is received in the threaded bore 239 of a block 240 rigidly secured as by bolts 242 to a platform 243 mounted on base plate 207.

It will be apparent that as the shaft is rotated in one direction by means of the handle, due to the engagement of its threaded end portion in the bore of the pillow block 240, the carriage is moved toward an end portion $e2$ of the pipe section and that when it is rotated in the opposite direction, it is moved away from the end portion $e2$ of the pipe section. The carriage has a pair of support members 251 and 252 which extend convergently upwardly from the longitudinal frame members 212 and 213 and which are welded at their lower ends to the longitudinal frame members and at their upper ends to a shaft support member 253. A shaft 254 is journaled in the support member and extends through the hub 257 of a mount disc 258. The mount disc is held on the shaft by means of a nut 259 threaded thereon on the outer end of the shaft.

The mount disc is provided with peripheral gear teeth 260 which are engageable by the teeth 261 of a rack gear 262. The rack gear extends slidably through a support 265 which may be welded to the cylinder 266 of a hydraulic ram 268. The ram cylinder is rigidly secured, as by bolts 271, to an angle or support column 274 whose lower end is welded to the longitudinal member 213 of the carriage frame 211.

It will be apparent when hydraulic fluid under pressure is introduced to the upper end of the ram cylinder 266 through the fitting 277 while fluid is allowed to exhaust from the bottom end of the cylinder through the fitting 278 of the cylinder, the force of the fluid pressure exerted on the piston 280 causes it to move downwardly and, since its piston rod 281 is secured to the lower end of the rack gear 262 by means of bolts 282 and the bracket 283 with the lower end of the rack, the rack gear will also move downwardly causing the total mount disc to rotate in a counterclockwise direction, FIG. 14. Conversely, when hydraulic fluid under pressure is introduced to the bottom fitting 278 of the ram cylinder and allowed to exhaust from its top fitting 277, the rack gear is moved upwardly and causes the tool mount disc to rotate in the opposite counterclockwise direction.

A plurality of hydraulic motors 291, 292, and 293 are rigidly secured to the tool mount disc by means of clamp assemblies 295. Each of the clamp assemblies 295 include a member 297 rigidly secured in any suitable manner to the tool mount disc and an outer member 298 which is secured to the other plate by bolts 299.

Each of the hydraulic motors rotates a cutting tool 301 which is secured to the drive shaft of the hydraulic motor by a suitable means such as a chuck 303.

The high-speed hydraulic motors 291, 292 and 293 may be provided with hydraulic fluid under pressure and be controlled in the same manner as the hydraulic motor fully described and illustrated in the patent to Robert A. Shuey, U.S. Pat. No. 3,479,922, issued Nov. 25, 1969.

It will be apparent that when the motors 291, 292 and 293 are in operation, the cutting tools 301 rotated thereby extend radially relative to the longitudinal axis of a pipe section $p$ held by the support pipe assemblies 201 and $201a$. As the carriage is moved by means of the screw shaft 230 toward the end portion 2 of the pipe, the cutting tools will engage the circular end surface $180a$ of the pipe. The rack gear is then reciprocated to rotate the tool mount disc, and therefore the hydraulic motors and the cutting tools driven thereby through an arc of approximately 140° so that the cut of one cutting tool 301 will overlap the cut of an adjacent cutting tool 301 during the oscillation of the tool mount disc through such 140°. The hydraulic motors are operated during such reciprocation oscillation of the tool in order that the circular end surface 180a be machined to a very fine finish thereby.

The clamp assemblies 201 and 201a are similar to the clamp assemblies 76. The clamp assemblies 201, however, are provided with means for adjusting the elevation of the pipe held thereby relative to the machining apparatus 51 and 51a, respectively. The clamp assembly 201 being similar to the clamp assembly 76, the elements of the clamp assemblies 201 have been provided with the same reference numerals, to which the subscript "b" has been added, as the corresponding elements of the clamp assembly 76.

The support columns 77b and 78b are connected adjacent their lower end by one or more plates 310 and their lower end portions extend slidably into the rectangular passage of a guide 314 whose lower end is welded or otherwise rigidly secured to the baseplate 207. A reinforcing gusset 315 extends from one side of the guide to the baseplate and is welded to both.

The assembly of the support columns and the connecting plate 310 is movable vertically in the guide 314 by a screw 317 whose lower threaded end portion is threaded in a pillow block 318 secured to one side of the guide 314 by studs 319 welded to the side of the guide and nuts 320. An arm 322 rigidly secured to the support columns 77b and 78b extends longitudinally outwardly of the guide through a slot 324 of the guide and is provided at its outer end with an aperture through which the shaft 317 extends. A pair of stop collars 325 and 326 rigidly secured to the shaft on opposite side of the arm 323 prevent longitudinal movement of the shaft relative to the arm 322. As a result, when the crank handle 328 secured to the upper end of the screw shaft 317 is employed to rotate the shaft, the rotation thereof in one direction of the shaft will cause the support columns to be moved upwardly and thus raise the end of the pipe supported thereby and when it is rotated in the opposite direction the support columns are lowered thus lowering the end of the pipe supported thereby.

The clamp assemblies 201 and 201a are provided with hydraulic rams for operating the top and bottom clamp members 93b and 84b thereof.

The machining apparatus 51a being identical to the machining apparatus 51, its elements have been provided with the same reference numerals, to which the subscript "a" has been added, as corresponding elements of the machining apparatus 51.

After the opposite end portions of a pipe section have been belled by the forming apparatus 50 and 50a, the pipe section is moved to the location of the apparatus 51 and 51a, rigidly clamped in the clamp assemblies 201 and 201a which are adjusted to cause the opposite end surfaces 180 and 180a to be in a true vertical plane and in proper alignment with apparatus 51 and 51a. The machining apparatus are then operated to machine the end surfaces 180 and 180a to cause them to lie in parallel vertical planes which are perpendicular to the longitudinal axis of the pipe.

Referring now particularly to the FIGS. 15, 16 and 17 of the drawings, the lapping apparatus 52 includes a carriage 210b which is similar to the carriage 210 of the machining apparatus 51 and, accordingly, its elements have been provided with the same reference numerals, to which the subscript "b" has been added as the corresponding elements of the carriage 210.

The tool mount disc 258b of the apparatus 52 is rotatable about the axis of its shaft 254b by the rack gear 262b whose teeth 261b mesh with the teeth 260b of the tool mount disc. Three hydraulic motors 351, 352 and 353 are rigidly secured by suitable clamp assemblies 354 to the mount plate at different radial distances from the axis of rotation of the tool mount disc. Each of the clamp assemblies includes a support member 355 rigidly secured to the tool mount disc and an arcuate member 356 secured to the support member 355 by bolts 357.

Each of the drive shafts of the hydraulic motors, which are of the same type and are controlled in the same manner as disclosed in the aforementioned patent to Robert A. Shuey, has a lapping wheel 358 rigidly secured thereto. The lapping wheels may of course be of any suitable type and have lapping or hone stones for engaging the pipe end surface. The carriage 210b is mounted on rails 225b and 226b of the base 200b for movement toward and away from the end portion e2 of the pipe held by the clamp assemblies 210b.

The lapping wheels 358 are rotated by their associated hydraulic motors 351, 352 or 353, an oscillatory movement of more than 360° about the axis of its shaft 254b is imparted to the tool mount disc 258b by the operation of the hydraulic ram 268b by introduction of hydraulic fluid under pressure to opposite ends of its cylinder 266b through its fittings 277b and 278b while simultaneously permitting exhaust of the hydraulic fluid from the other fitting 278b and 277b, respectively. Since the lapping wheels are rotating about the axes of rotation of the drive shafts of their respective hydraulic motors and, at the same time, the motors are caused to rotate about axes which are spaced at different distances from the axis of rotation of the mount disc 258b, a very fine finish is imparted to the pipe end surface 180a. For example, the surface finish may be uniform to a tolerance of less than 30 and preferably approximately 15 micros. The other lapping apparatus 52a if identical in structure to the apparatus 51 and, accordingly its elements have been provided with the same reference numerals, to which the subscript "a" has been added, as the corresponding elements of the apparatus 51.

It will be apparent that the carriage 210ba is moved toward and away from the left-hand circular end surface 180 of the section of pipe P by the rotation of its shaft screw 230 by means of the handle 236ba to move the lapping wheels 358b into engagement with the left-hand end surface 180 of the pipe as the hydraulic motors rotate the lapping wheels and the tool mount disc 258b is oscillated by the rack gear 262ba.

It will also be apparent that during the lapping or finishing operation, the pipe is held rigidly and in proper alignment to the finishing apparatus 52 and 52a by the clamp assemblies 210b which are identical to the construction to the clamp assembly 201 of the machining apparatus and accordingly, the elements of the clamping assembly 201 and 201ab have been provided with the same reference numerals, to which the subscript "b" has been added as the corresponding elements of the pipe assemblies 201 and 201a, respectively.

Referring now particularly to FIGS. 18, 23 and 25 of the drawings, the clamping assembly 53 for forcibly bringing the opposed end surfaces 180 and 180a of two pipe sections into forcible contact includes a carriage 400 mounted for movement on a pair of tracks 401 an 402 welded or otherwise rigidly secured to a baseplate 404. The base plate 404 is secured to the deck of a pipe laying vessel. The carriage includes a rectangular frame 405 having a longitudinal side member 406 connected by transverse end members 408 and 409. The carriage is supported on pairs of flanged wheels 411 and 412 mounted on shafts 414 and 415 journaled in suitable dependent brackets 416 and 417 secured as by welding to the longitudinal members 406 of the carriage. A floor or platform 418 is rigidly secured to the carriage frame members.

A pair of end support columns 420 and 421 are rigidly secured as by welding to the carriage transverse end frame members 408 and 409 and also to the platform 418. Gussets 423 and 424 extend between the columns 420 and 421 and the floor and are rigidly secured thereto.

A clamp ring 426 is supported for limited movement on the upper end of the column on brackets 427 welded to the support column 420. The brackets 427 have stops 428 at their ends for limiting movement of the clamp ring to the left, FIG. 23, its movement to the right being limited by the Column 420. The clamp ring 426 has a plurality of hydraulic rams 430a, 430b, 430c and 430d, mounted thereon by means of bolts 431 which secure the cylinders 432 of the hydraulic rams to the external surface of the clamp ring. The pistons 434 of the rams have piston rods 435 which extend inwardly through suitable bores 436 of the clamp ring and are provided with arcuate feet 437 having resilient pads 438 which are engageable the external surface of the coating C of the pipe section 52.

It will be apparent that when hydraulic fluid under pressure is introduced to the outer ends of the cylinders 432 of the hydraulic rams through the conduits 441 and is allowed to exhaust from their inner ends through the conduits 442, the pistons are moved inwardly with a force which varies in accordance with the pressure of the hydraulic fluid introduced through the conduits 441. The foot plates 437 rigidly secure the clamp ring to the pipe section over which the clamp ring is telescoped.

A plurality of longitudinally extending hydraulic rams 450 have cylinders 451 which are secured to the clamp ring 426 by means of the rods 452 which may be integral with cylinders. The reduced end portions of the rods 452 extend through suitable bores of the radially outwardly extending external brackets 453 of the clamp ring and are secured thereto by nuts 454 threaded on the ring reduced end portions of the rods.

The pistons 456 of the rams 450 have piston rods 457 which extend outwardly of the cylinders and are provided at their outer ends with arms 458 secured on their reduced threaded end portions by nuts 459. The arms 458 extend radially inwardly into longitudinal slots 459 of bars 460 which extend longitudinally from a second clamp ring 462 which is mounted for limited movement on the brackets 463 of the support column 421.

The brackets 463 are provided with stops 465 engageable with the clamp ring for limiting movement of the clamp ring 462 relative to the column. The clamp ring 462 whose piston rods extend radially inwardly and are provided with foot plates 467 having pads 468 which engage the external surfaces of the other pipe section S1.

It will be apparent that the clamp ring 462, is secured to the pipe right-hand section S1 by means of the hydraulic rams 467 when fluid under pressure is introduced to the outer ends of the cylinders through their conduits 469 and is allowed to exhaust from the lower ends of the cylinders of the rams through the conduits 470 in the same manner as the clamp ring 426 is secured to the pipe section 52.

It will be apparent that when fluid under pressure is introduced to the front ends of the cylinders of the compression hydraulic rams 451 through their conduit 474 while fluid is allowed to exhaust from their right hands ends, FIG. 23, through the conduits 475, the two pipe sections s2 and s1 to which the clamp rings 426 and 462 are rigidly secured will be pulled toward one another and their annular end surfaces 180 and 180a will be held against one another with a predetermined pressure.

The pipe sections S1 is supported on a carriage 480 which is movable on rails 401 and 402 by means of its wheels 481 and 482. Clamp assemblies 484 and 485 which are mounted on the opposite ends of the carriage 480 support the pipe section S1 and permit its vertical adjustment relative to the pipe section S2.

Since the clamp assemblies 484 and 485 are identical in structure to the pipe assembly 201, their elements have been provided with the same reference numerals, to which the subscript "c" has been added, as the corresponding elements of the clamp assembly 201.

It will be apparent that opposite ends of the pipe section S1 may be adjusted vertically so that its longitudinal central axis of the pipe section S2 which is similarly supported by a carriage 490. The carriage S2 is also movably supported on the rails 401 and 402 by means of wheels 491 and 492. The clamp assemblies 494 and 495 of the carriage 490 are identical to the clamp assemblies 201 and, according, their elements have been provided with the same reference numerals to which the subscript "d" has been added, as the corresponding elements of the clamp assembly 201.

Figure 6:
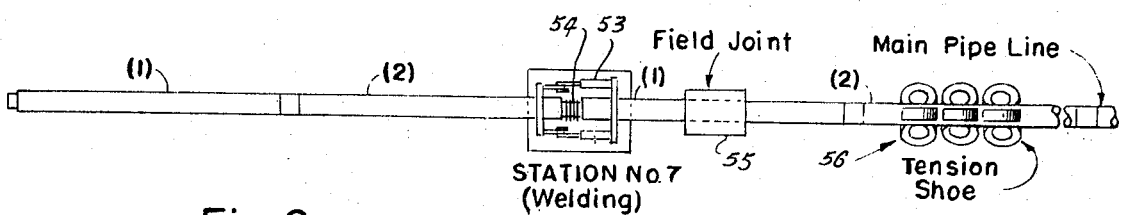

It will be apparent that the carriage 480, 210 and 490 are movable longitudinally on the rails 401 and 402 which may extend parallel to and in longitudinal alignment with the pipeline L as illustrated in FIG. 6 so that if the pipe section S2 constitutes the last pipe section of the pipeline, the three carriages may move with the pipeline as the pipeline moves longitudinally relative to the vessel from which the pipeline is being layed.

Referring now particularly to FIGS. 21 and 23, the carriage 400 also has a support column 501 whose lower end is rigidly secured, as by welding, to the platform 418 of the carriage 400.

Reinforcing gussets 50 may also be secured to the carriage and the column. An induction coil assembly 510 is mounted on a shaft 511 carried by one or more brackets 512 welded to the upper end of the support column 501. The coil assembly 510 comprises, in the illustrated embodiment, five coils 514a–e formed of hollow electric conduits. Each coil 514 may have two sections 517 and 518 whose front ends are closed and whose rear ends have brackets 520 and 521, respectively, which are of an electrically nonconductive substance and are provided with aligned apertures through which the shaft 511 extends so that the two sections are pivotal relative to one another.

The rear ends of the coil sections 517 and 518 of each coil are connected by a tubular flexible member 524 connected to the rear ends by any suitable means. Cooling water may be circulated through each coil by means of a flexible inlet conduit 526 which is connected to the front end of its coil section 518 by means of a suitable coupling or fitting 527 and an outlet or return flexible conduit 528 which is connected to the front end of the coil section 517 by a suitable fitting or coupling 529. The rear ends of each coil are electrically connected to one another by a flexible electrical conductor 530. The front ends of the two coil sections 517 and 518 are connectable across a source of high-frequency electric current by means of conductors 531 and 532, respectively.

As illustrated in FIG. 23, the narrow gaps between the front ends of the several coil sections are in staggered relationship relative to prevent uneven heating of the exposed end portions of the pipe by the currents induced therein by the high frequency alternating current in the several coils. The narrow gaps at between the coil sections of each coil at the rear ends thereof are also staggered vertically for the same reason.

The upper coil sections 517 are releasably holdable in their operative lower positions illustrated in FIG. 21 by a nonconductive strip 21 secured to the bracket 512 which engages the brackets 520 of the top coil sections. The lower sections 518 of the coils are releasably supported in their upper operative positions by a latch 536 which is also of an electrically nonconductive substance and of which is pivotably secured to the bracket 512 as by a shaft 537. The upper sections of the coils may be supported in their raised position by a latch bar 539 also pivotably secured to the bracket or brackets 512.

The two sections of the coils are pivotable through angles sufficiently great that the coils will clear the outer coating C of the pipe sections to permit longitudinal movement of the pipes relative to the coil assembly.

It will be apparent that the two pipe sections whose end surfaces 180 and 180a are compressed together with a relatively high force will be heated by the currents induced in the ends of the pipe sections at the locations of the engagement of the two sections of the surfaces 180 and 180a by the currents induced therein by the electromagnetic field produced when the coils are energized by a relatively high-frequency alternating current.

The surfaces of the pipe sections at the locations at which the weld is made are subjected to a protective atmosphere of an inert gas as, for example, argon, by a gas manifold assembly 600 which is movable through one of the pipe sections to the location of the contacting end surfaces 180 and 180a thereof. The manifold assembly includes two complimentary domed bellows sections 601 and 602 which are formed of a resilient substance. The section 601 of the manifold has a central portion 603 which is a section of a sphere and external annular flange 604 provided with an internal annular recess 605. Similarly, the manifold section 601 has a central boss or enlargement 608 having a central aperture through which extends a piston rod 609 of a hydraulic ram 610. An O-ring 610 seals between the piston rod and the enlargement 607.

The piston rod is held against movement in one direction relative to the boss by a nut 611 threaded on the reduced end portion 612 of the piston rod and against movement in the opposite direction by the engagement of the external annular shoulder 614 of the piston rod with the internal annular shoulder 615 of the manifold section. An O-ring 616 or other suitable is disposed in an internal recess of the boss 607 and seals between the boss and the piston rod. The outer external surfaces 621 and 622 of the manifold sections 601 and 602, when the sections in their normal nonexpanded positions, are of smaller diameter than the internal diameter of the pipe sections so that the manifold assembly may be moved longitudinally through one of the pipe sections, for example, the pipe section S1 to the location of the contacting end surfaces 180 and 180a of the two sections. The manifold sections are then expanded by the movement of the piston 624 of the hydraulic ram 610, which causes the opposed facing edge surfaces of the two manifold sections to engage. Due to the resilience of sections 601 and 602 as they are forcibly drawn to one another, their peripheral outer surfaces 621 and 622 are brought into sealing engagement with the internal surfaces of the two pipe sections on opposite sides of the line of contact of the end surfaces 180 and 180a. The chamber 625 defined by the two manifold sections is in communication with the external annular recesses 627 and 628 of the two sections by means of the slots 629 provided in one or both of the opposed edge surfaces of the two sections.

The manifold section 602 is provided with two flexible conduits 631 and 632 by means of fittings 633 and 634, respectively. One of the conduits, e.g., the conduit 631, is used to withdraw air from the chamber 625 and thus from the recesses 627 and 628, and the other conduit 632 may be connected to a source of inert gas, such as argon, under pressure so that the inert gas may be circulated to the recesses 627 and 628 as will be described below.

The cylinder 636 of the cylinder ram and a positioning dolly 638 are secured to the central boss 608 of the manifold section 602 by means of bolts 639 which extend through aligned apertures in an external flange of the ram cylinder and in the central portion of the dolly into threaded bores of the boss 608. The dolly has a plurality of radially outwardly extending arms 640 which have resilient pipe engaging rollers or tires 641 rotatably mounted thereon by means of brackets 642 and shafts 643.

The dolly is movable inwardly through the pipe sections by means of a rod 645 secured by nuts 647 threaded on its inner end which extend through a suitable aperture of the dolly.

It will be apparent that when hydraulic fluid under pressure is transmitted through a flexible conduit 647 to the one end of the ram cylinder 636 and allowed to exhaust on the other end of the cylinder through the flexible conduit 648, the piston rod will be drawn inwardly in the cylinder and cause the manifold sections 601 to move towards the manifold section 602 and cause their radial expansion. Conversely, when fluid under pressure is transmitted through the conduit 648 to the outer end of the ram cylinder and allowed to exhaust from the other end through the conduit 647, the piston rod is moved to its extended position permitting the two manifold sections to contract radially and move apart so that their peripheral surfaces will no longer engage the internal surfaces of the pipe sections.

Figure 28:
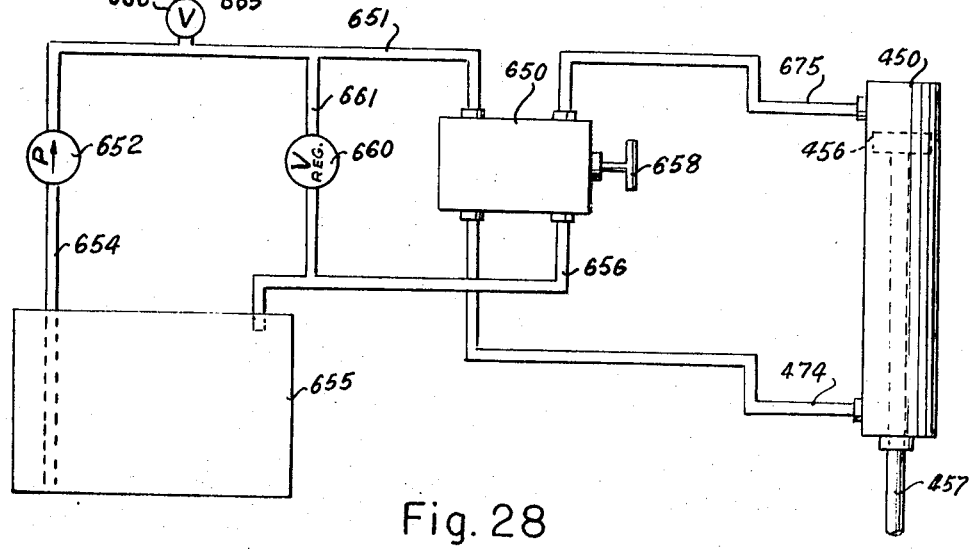
FIG. 28 is a schematic illustration of a representative hydraulic circuit for any one of the hydraulic rams of the apparatus embodying the invention.

Referring now particularly to FIG. 28, the operation of each of the hydraulic rams, as, for example, one of the compression hydraulic rams 450, is controlled by a suitable four way valve 650 which in one of the positions is effective to place the conduit 475 in communication with a pressure conduit 651 connected to the outlet of a pump 652 whose inlet is connected by a conduit 654 to a reservoir 655 of hydraulic fluid and to place the other conduit 474 in communication with an exhaust conduit 656 which opens to the reservoir 655. In another position of the four valve 650 the conduit 474 is connected to the pressure conduit 651 and simultaneously the conduit 475 is connected to the exhaust conduit 656.

It will therefore be apparent that by proper movement of the operator member 658 of the four way valve, the piston rod 457 may be moved either between its retracted and extended positions.

A pressure regulator valve 660 is connected in a bypass conduit 661 which connects the conduits 651 and 656. It will be apparent to those skilled in the art that the pressure regulator valve may be of the type which may be adjusted to maintain the pressure in the conduit 651 at a predetermined adjustable value.

A pressure accumulator 664 may also be connected to the pressure conduit 651 by a conduit 665 in which a valve 666 is connected. The accumulator may be of any usual type having a flexible diaphragm 668 dividing the accumulator into a lower hydraulic fluid chamber 669 and an upper air chamber 670. A conduit 671 opens to the atmosphere and to the air chamber and is provided with a valve 676. The valves 650, 660, 666 and 672 may be controlled either manually or by solenoid valves whose operation then of course would be controlled by suitable switches or relays of a suitable control circuit.

It will be apparent to those skilled in the art that as the pump 652 is placed in operation and the valve 666 is open, the pressure in the conduit 651 will be raised as hydraulic fluid is pumped into conduit 651 and into the hydraulic fluid chamber 669 compressing the air in the chamber 670 as the diaphragm flexes upwardly when the valve 666 is closed and the valve 672 is open. When the pressure in the conduit 651 and of course in the accumulator 664 rises to the value at which the pressure regulator valve 660 is set, the valve will open to such degree that the pressure in the conduit 651 is maintained at an adjusted predetermined value as the liquid being pumped by the pump 652 is bypassed through the bypass conduit 661.

If the valve 650 is now operated to permit flow of fluid to exhaust from the conduit 474, the accumulator 464 prevents a sudden drop in the pressure in the conduit 651 since the force of the compressed air in the chamber 670 will now be effective to move some of the hydraulic fluid from the lower chamber 669. The pressure of the hydraulic fluid will of course maintain a constant force on the piston 456. When it is desired to release such force abruptly, which cannot be easily accomplished by stopping the operation of the pump 652 or fully opening the valve 660. The valve 672 may be opened to permit a sudden drop in the pressure in the conduit 651 at the same time that the valve 660 is opened fully.

The schematic illustration and the above description of the operation of the hydraulic circuit of the rams being well known to those skilled in the art it will not be described further herein.

The coils 514a–e of the coil assembly 511 are connected across the secondary winding 680 of a stepdown transformer 681 by means of the conductors 531 and 532 which are connected to the conductor 682 and 683, respectively, which in turn are connected to opposite ends of the secondary winding. The primary winding 685 of the stepdown transformer is connected across the output circuit of a high-frequency alternating current generator 686 of any suitable type by means of conductors 687 and 688. The input circuit of the frequency generator is connectable across an alternating current input circuit 690 by means of a conductor 691 connectable to one terminal 692 of the input circuit, and to the other input terminal 693 of the input circuit by a conductor 694, a switch 695 and a conductor 696.

It will be apparent therefore that the coils 514a–e of the coil assembly 510 will be energized with a high-frequency alternating current, for example, a thousand cycles per second each time the switch 95 is closed. The switch 695 may be manually operable or electrically operable by a suitable solenoid. The frequency generator is provided with suitable control means for varying or adjusting the frequency and intensity of the currents induced in the pipe end portions by the electromagnetic field produced by the coils when energized.

Figure 26:
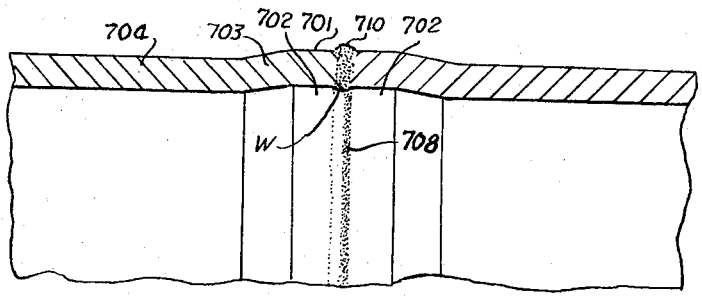
FIG. 26 is a fragmentary enlarged sectional view showing the welded end portions of a pair of pipe sections.
Figure 27:
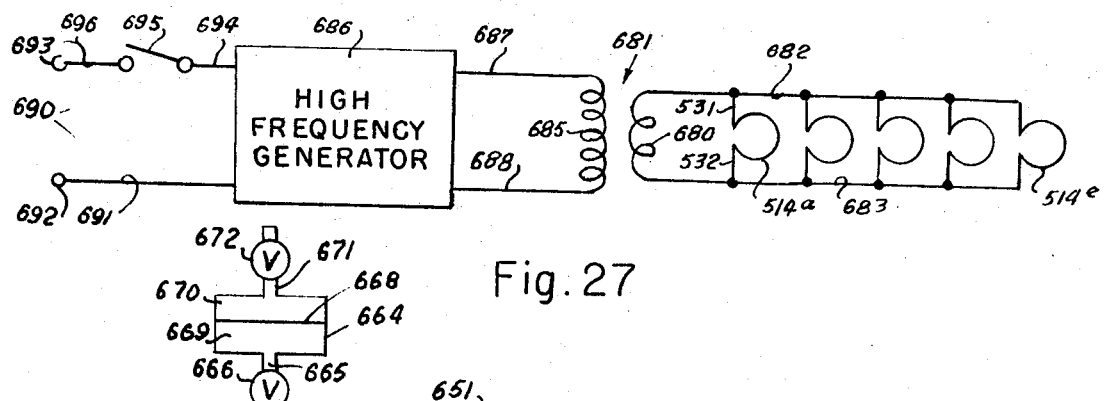
FIG. 27 is a diagrammatic illustration of the circuit for energizing the induction coils of the welding apparatus with high frequency alternating current.

As illustrated in FIGS. 1 through 6, apparatus for connecting two short length pipe sections to one another and then to the main pipeline L are all mounted on the deck of pipe laying vessel which also has a storage area or racks for a relatively large number of the four foot length pipe sections. The pipe sections are moved by suitable pipe moving means from the storage area or rack to station No. 1 where the belling apparatus 50 and 50a telescope into opposite end portions e1 and e2 of the pipe sections and expand radially the outer end portions of the pipe sections to cause them to have the form illustrated in FIG. 26. The extreme circular end portion 701 has an internal cylindrical surface 702 and a beveled surface 703 which extends inwardly to the intermediate portion of the pipe 704. The internal diameter of the portion 701 is somewhat greater than the internal diameter of the intermediate portion 704 of the pipe. For example, the internal surface 702 has a diameter of 24¼ inches if the intermediate section 704 has an internal diameter of 24 inches.

The pipe section after its opposite end portions have been formed at the belling station No. 1, is moved to the machining station No. 2 where the end surfaces 180 and 180a of the pipe section are machined to cause their circular end surfaces to lie in vertical spaced planes perpendicular to the central longitudinal axis of the pipe section.

The pipe section is then moved to the lapping station No. 3 when a fine finish is imparted to the end surfaces by the lapping or finishing apparatus 52 and 52a.

A pair of such sections is then moved to the welding station No. 4 which may be of substantially same structure as illustrated in FIG. 23. The two sections are moved into longitudinal vertical alignment by proper adjustment of the clamp assemblies mounted on the carriages 480 and 490 and these carriages are moved toward opposite ends of the carriage 210 to cause the pipe sections to telescope into the clamp rings 426 and 462.

The clamp assemblies now hold the pipe in proper vertical alignment and in substantial lateral alignment. If it is necessary to move one pipe section or the other laterally and horizontally, since movement may be accomplished by proper operation of the hydraulic rams 430 or 467 of the two clamp rings 426 and 467. It will be apparent that sufficient lateral movement may be imported to the two pipe sections to achieve full concentric longitudinal alignment due to the resilience of the various pads of the clamp assemblies and some movement of the carriages on the rails.

Alternatively, of course, the clamp assemblies of the two carriages 280 may be mounted on the carriages for lateral movement thereon by a suitable means, similar to the vertical adjusting screw means of the clamp assemblies.

The two sections S1 and S2 are then aligned and held rigidly by the hydraulic rams of the clamp rings 426 and 462 which are operated by suitable four way valves as described above. The coils of the coil assembly are moved to the operative positions illustrated in the drawings. The hydraulic compression rams 450 are actuated to cause the two pipe sections to be moved toward one another and their contacting end surfaces 180 and 180a are pressed together with a predetermined pressure.

The gas manifold assembly is then inserted through one of the pipes by means of the rod 645 and the dolly 638 to a location of the surfaces 180 and 180a of the two pipe sections as illustrated in FIGS. 19 and 22. Air is then withdrawn from the chamber 625 and a predetermined vacuum condition is created. An inert gas, such as argon is circulated through the chamber 25 and thus through the slots 629 to the inner end surfaces of the two pipe sections at the locations of the areas of contact of the end surfaces 180 and 180a. The argon may be placed under the pressure so that any air that may be present between the two contacting surfaces 180 and 180a will tend to be displaced outwardly therefrom. The coils are then energized with an alternating current of a frequency and intensity predetermined by the characteristics of the pipe sections, such as their diameter, wall thickness and the metal of which the pipes are made, which induces electric currents in the abutting end portions of the two pipe sections. This heating initially causes the inner portions of the end portions 701 to heat more rapidly because their outer portions have a greater heat capacity due to their larger volume which increases with the radius of the pipe and due to the fact that the external surfaces have larger areas for heat dissipation by radiation, conduction and convection. As the inner radially portions of the end portions 701 of the two pipe sections heat to a welding pressure, they soften, weld and begin to form the inner annular upset 708. The pressure with which the two pipe sections are pressed to one another is then abruptly reduced so that the internal annular upset 708 being formed by the flow of the end portions of the pipe does not extend too far inwardly and to control the flow of current through the now partially molten or softened innner portions of the end portions 701. Subsequently the pressure is again increased one or more times at predetermined time intervals to insure that a proper weld is formed throughout the thickness of the pipe and that the external annular upset 710 is formed.

Any air which may have been present between the two contacting end surfaces 180 and 180a if it has not been displaced by the argon will be driven from therebetween during the heating of the end portions so that any air which may have been present therebetween will not interfere with the welding. If necessary in particular applications, a suitable housing may be disposed about the outer surface at the location of contact of the end surfaces of the two pipe sections into which argon or other inert gas may be circulated prior to the beginning to the heating of the two pipe sections. The internal upset 708 has an internal diameter greater than the internal diameter of the intermediate portion 704 of the sections so that the upset does not restrict the longitudinal passage of the pipe formed of the two sections.

After the two sections of the pipe have been welded to one another, a suitable X-ray apparatus may be used to X-ray the weld to ascertain that the two sections are properly joined together.

Figure 4:
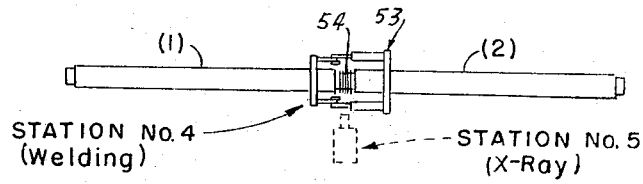
Figure 5:
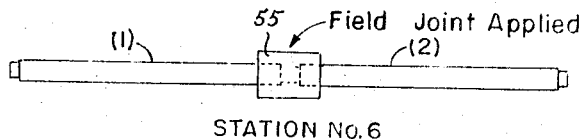

After the two sections have been joined together and X-rayed at stations No. 4 and No. 5 as illustrated in FIG. 4, the joined sections may be moved to a suitable station No. 6, as illustrated in FIG. 5, where a field joint or covering is applied about the exposed portions of the pipe sections between their respective coatings C.

A pair of sections 1 and 2 which are joined are then moved to station No. 7 where one end of this joined pair of sections is connected to the upper end of the pipeline L which extends from the welding station, such as the one illustrated in FIGS. 18 through 25, with the end of the pipeline at the welding station being secured to the carriage 490 by a clamp assemblies 494 and 495. The carriage 410 is then moved into the position relative to the end of the pipeline or the section S2 of the pipe illustrated in FIG. 18 and the clamp ring 426 is secured thereto by its rams. The pair of joined sections are then mounted on the clamp assemblies 484 and 485 of the carriage 480 and are moved with the carriage until the one end thereof moves through the clamp ring 462 and the clamp ring is rigidly secured thereto. The coil assembly, whose coils have been pivoted to their outer expanded positions to clear the coatings are pivoted into their operative position, the hydraulic rams 450 are operated to draw the pair of joined sections of pipe toward the end of the pipeline and the induction coil assembly is energized to weld the joined pair of sections to the pipeline in the manner desired above.

After the welding has been completed the rams of the clamp rings 426 and 462 and the compression rams 450 are released so that the pipeline may now be moved to an apparatus 55 where the covering is applied to the exposed end portions of the pipe sections and the pipeline.

The vessel is moved a distance of substantially eighty feet to a length of pipeline of substantially this length on the earth below the body of the water.

During the welding process, the carriages 480, 210 and 490 may of course move with the pipeline relative to the vessel as the vessel is moved by wave action since the tension shoe which maintains the portion of the pipeline extending from the vessel into the water under tension permits such movement longitudinal directions while maintaining the predetermined tension on the portion of the pipeline extending from a vessel.

It will be apparent that while the method and apparatus embodying the invention has been illustrated and described in connection with the laying of submerged pipeline from a vessel, the method and apparatus may be used to join short sections of pipe at a manufacturing facility or may be used in the making and laying of a pipeline from a land vehicle onto a surface of the earth, into a treanch in the surface of the earth, or onto any supporting structure such as a bridge trestle or the like. It will be apparent that the pipeline formed of the short sections will not have any internal restrictions at the locations of junctures of the pipe sections since the internal annular upset of the welds are at the outwardly radially enlarged end portions of the pipe sections so that pipeline tools may pass through the pipeline which would not be the case if the opposite end portions of the pipeline sections were not enlarged internally.

It will further be seen that various elements of the apparatus embodying the invention have been illustrated schematically for clarity of illustration and modified forms thereof may be used. For example, while particular clamping assemblies have been illustrated and described for holding the pipe sections during the performance of various operations thereon, any other suitable clamp means may be employed for this purpose. Similarly, while the forming apparatus 50 has been illustrated as being of the type which requires the imposition of longitudinally directed forces on the pipeline, a belling apparatus could be employed which would be insertable in the exposed end portions of the pipe section with their expansion then accomplished by hydraulic or other means which radially expand the forming apparatus without imposing longitudinal forces on the pipe section.

The foregoing description of the invention is explanatory only, and changes in the details of the construction illustrated may be made by those skilled in the art, within the scope of the appended claims, without departing from the spirit of the invention.

What is claimed and desired to be secured by Letters Patent is:

1. An apparatus for welding together opposed ends of two sections of pipe comprising: first means for radially expanding opposite end portions of each pipe section; machining means adjacent said first means for machining opposite annular end surfaces of each section after said end portions have been expanded by said first means to cause the circular end surfaces thereof to lie in parallel planes extending perpendicular to the longitudinal axis of the pipe sections; second means adjacent said machining means for finishing opposite end surfaces of each pipe section after said end surfaces have been machined by said machining means to provide a uniform planar surface; third means adjacent said second means for aligning opposed end surfaces of the pair of sections after said end surfaces have been finished by said second means and for moving the opposed end surfaces into compressive contact with each other; fourth means disposed about the opposed abutting end portions of the two pipe sections providing an electromagnetic field for inducing electric currents in the end portions for raising the abutting end portions to a welding temperature; and control means operatively associated with said third means for varying the compressive pressure with which said end surfaces are held in contact by said third means.

2. The apparatus of claim 1, wherein said third and fourth means are mounted for longitudinal movement on a vessel and wherein one of said sections comprises the upper end of a pipeline extending from said third means into a body of water through a tensioning means for maintaining under tension the portion of the pipeline extending from the vessel into the body of water.

3. The apparatus of claim 2, wherein said third means comprising carriage means mounted on the vessel for longitudinal movement relative to the tensioning means and the pipeline held by the tensioning means, and means for concentrically aligning one of the pair of pipe sections with the upper end of the pipeline mounted on said carriage; and pipe engaging means on said carriage for engaging said sections and pulling said sections toward one another.

4. The apparatus of claim 3, wherein said fourth means comprises induction coil means mounted on said carriage and positionable about said abutting end portions of the two pipe sections.

5. The apparatus of claim 4, wherein said pipe engaging means comprises a pair of spaced clamp means telescopical over said two said sections of pipe and operable to rigidly engage said sections.

6. The apparatus of claim 5, wherein said pipe engaging means includes hydraulic means operatively associated with said clamp means for moving said clamp means toward one another.

7. The apparatus of claim 6, and control means operative associated with said hydraulic means for varying the pressure with which said hydraulic means move said clamp means toward one another.

8. The apparatus of claim 2, wherein said third means comprises a carriage movably mounted on said vessel and having clamp means for supporting said one of said one pipe sections.

9. The apparatus of claim 1, wherein said means for machining opposite annular end surfaces comprises a carriage, rotatable mount means mounted on said carriage; a plurality of cutting tools on said mount means, and means for rotating said mount means.

10. The apparatus of claim 1, wherein said second means comprises carriage means movable toward and away from an end surface of a pipe section, and a plurality of lapping means movably mounted on said carriage about said end surface.

11. The apparatus of claim 10, and means for moving said lapping means eccentrically relative to the end surface.

* * * * *